United States Patent
Shimada et al.

(10) Patent No.: US 7,181,166 B2
(45) Date of Patent: Feb. 20, 2007

(54) COMMUNICATION CHANNEL SET UP METHOD AND COMMUNICATION CONTROL DEVICE FOR REDUCING INTERFERENCES BETWEEN RADIO COMMUNICATION SYSTEMS

(75) Inventors: Naoto Shimada, Yokosuka (JP); Osamu Nakamura, Yokosuka (JP); Shinji Uebayashi, Yokohama (JP); Takanori Utano, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 326 days.

(21) Appl. No.: 10/153,898

(22) Filed: May 24, 2002

(65) Prior Publication Data
US 2002/0177414 A1 Nov. 28, 2002

(30) Foreign Application Priority Data
May 25, 2001 (JP) ............................. 2001-157797

(51) Int. Cl.
*H04B 15/00* (2006.01)
*H04B 1/00* (2006.01)
*H04M 1/00* (2006.01)
*H04Q 7/20* (2006.01)

(52) U.S. Cl. .................... 455/62; 455/63.1; 455/63.13; 455/552.1; 455/501; 455/426.1; 455/448

(58) Field of Classification Search ................ 455/62, 455/63.1, 67.13, 552.1, 553.1, 450–453, 455/501, 502, 509–516, 426.1
See application file for complete search history.

(56) References Cited

U.S. PATENT DOCUMENTS

| | | | | |
|---|---|---|---|---|
| 5,890,056 A | * | 3/1999 | Garner et al. | ............ 455/67.11 |
| 5,978,362 A | * | 11/1999 | Lee et al. | .................... 370/315 |
| 6,101,176 A | * | 8/2000 | Honkasalo et al. | ......... 370/335 |
| 6,868,277 B1 | * | 3/2005 | Cerwall et al. | ............. 455/509 |

FOREIGN PATENT DOCUMENTS

| | | |
|---|---|---|
| EP | 0 818 936 | 1/1998 |
| JP | 11-69426 | 3/1999 |
| JP | 11-341555 | 12/1999 |
| JP | 2000-201372 | 7/2000 |

OTHER PUBLICATIONS

C. R. Chang, et al., Vehicular Technology Conference IEEE, pp. 772-776, XP-010341950, "Experimental Investigations of PCS Interference Between CDMA and GSM", May 16, 1999.

* cited by examiner

*Primary Examiner*—George Eng
*Assistant Examiner*—Un C. Cho
(74) *Attorney, Agent, or Firm*—Oblon, Spivak, McClelland, Maier & Neustadt, P.C.

(57) ABSTRACT

In a communication channel set up method, the utilization state of a prescribed frequency in the first frequency band that causes interferences to the first communication system when the communication channel of a particular frequency in the second frequency band is used at the second communication system is detected, and if the prescribed frequency in the first frequency band is currently used, the communication channel other than that of the particular frequency is allocated to the second communication system.

8 Claims, 5 Drawing Sheets

FIG.6

| CHANNEL | CURRENTLY USED |
|---|---|
| 121a | ○ |
| 121b | × |
| ⋮ | ⋮ |

121 = {121a, 121b}

→ MEMORY UNIT 12

FIG.7

| CHANNEL | USABLE |
|---|---|
| m | × |
| m-1 | × |
|  |  |
| ⋮ | ⋮ |
| n+1 | × |
| n | ○ |
| n-1 | ○ |
| ⋮ | ⋮ |
| 2 | ○ |
| 1 | ○ |

102 = {m ... n+1}
101 = {n ... 1}
100 = 102 + 101

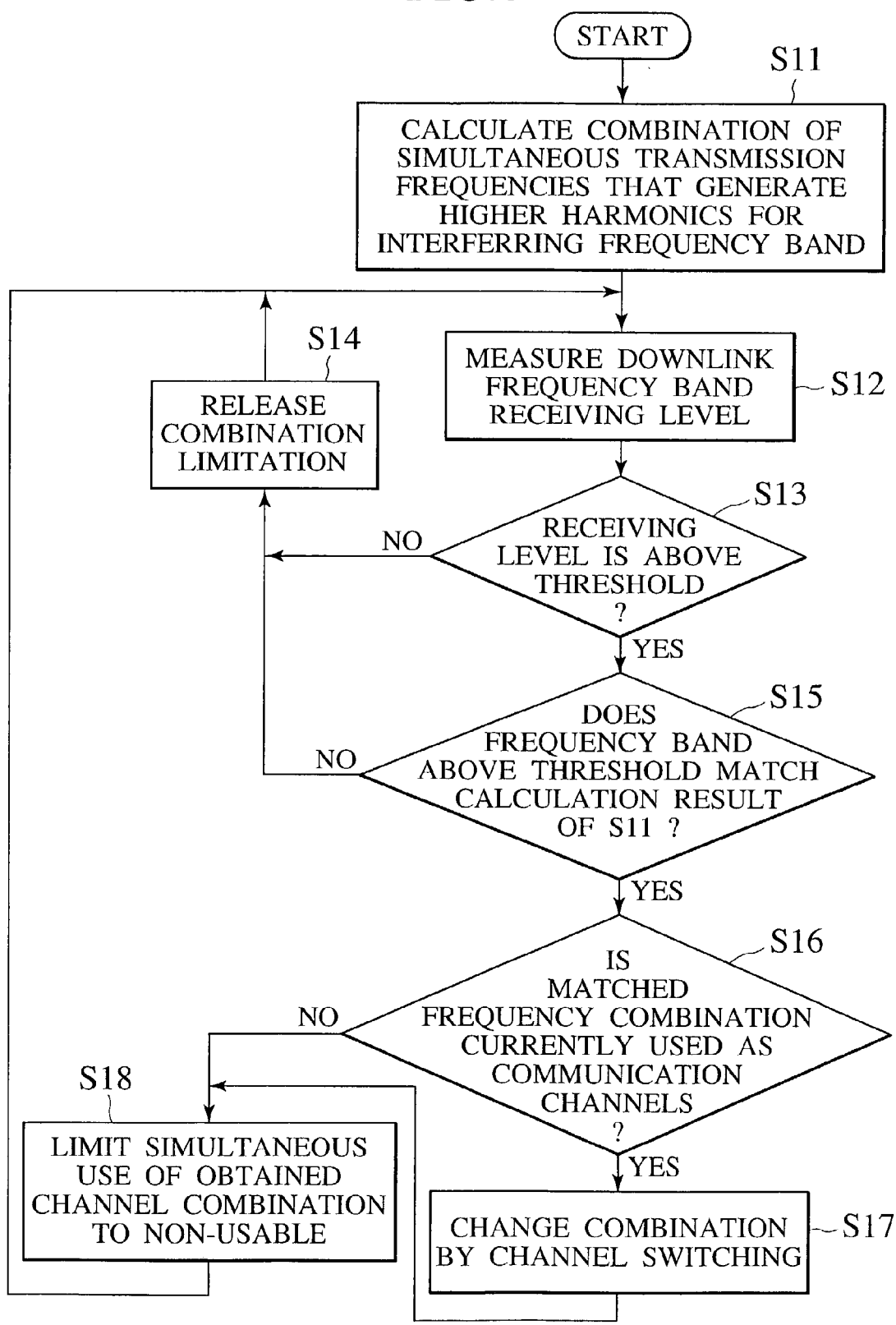

COMMUNICATION CHANNEL SET UP METHOD AND COMMUNICATION CONTROL DEVICE FOR REDUCING INTERFERENCES BETWEEN RADIO COMMUNICATION SYSTEMS

BACKGROUND OF THE INVENTION

1. Field of the Invention

The present invention relates to a communication channel set up method and a communication control device, and more particularly, to a communication channel set up method and a communication control device for reducing interferences between radio communication systems using radio signals of close frequencies.

2. Description of the Related Art

As a method for avoiding interferences between radio communication systems using radio signals of close frequencies, a method for providing the so called guard band between frequency bands used by the respective radio communication systems is known. In this method, there is a need to set a wide guard band when a range of components outside the frequency band is wide.

However, the interferences among the radio communication systems vary according to arrangements of base stations and mobile terminal devices constituting the radio communication systems, etc., so that they do not necessarily occur always. For this reason, an excessively wide guard band will only lower the frequency utilization efficiency.

For this reason, there is a known method (random assignment by carrier sense) in which a noise component of a frequency desired to be used is measured in advance, a frequency with a large noise power is regarded as receiving interferences from other radio communication system, and a frequency with a small noise power is used.

Now, in the radio communication device, the spurious components such as higher harmonic components of the carrier component, the intermodulation distortion components, etc., are generated due to the non-linearity of the amplifier, etc. There are cases where these spurious components are generated in a frequency region largely separated from the carrier frequency such that they become components outside the frequency band that can be used by that system.

However, in the random assignment described above, whether or not the spurious components generated outside the frequency band of that system are going to cause interferences to the other radio communication systems when the specific frequency is used by that system has not been judged.

BRIEF SUMMARY OF THE INVENTION

It is therefore an object of the present invention to provide a communication channel set up method and a communication control device capable of contributing to the reduction of interferences between two radio communication systems using radio signals of close frequencies.

According to one aspect of the present invention there is provided a communication channel set up method for setting up a communication channel to be used by a second radio communication system that can use a second frequency band close to a first frequency band that can be used by a first radio communication system, comprising: detecting a utilization state of a prescribed frequency in the first frequency band that can cause interferences to the first radio communication system when a communication channel of a particular frequency in the second frequency band is used by the second radio communication system; and allocating a communication channel other than that of the particular frequency to the second radio communication system when the prescribed-frequency in the first frequency band is currently used by the first radio communication system.

According to another aspect of the present invention there is provided a communication control device for controlling a communication channel to be used by a second radio communication system that can use a second frequency band close to a first frequency band that can be used by a first radio communication system, comprising: a detection unit configured to detect a utilization state of a prescribed frequency in the first frequency band that can cause interferences to the first radio communication system when a communication channel of a particular frequency in the second frequency band is used by the second radio communication system; and an allocation unit configured to allocate a communication channel other than that of the particular frequency to the second radio communication system when the prescribed frequency in the first frequency band is currently used by the first radio communication system.

Other features and advantages of the present invention will become apparent from the following description taken in conjunction with the accompanying drawings.

BRIEF DESCRIPTION OF THE DRAWINGS

FIG. 6 is a diagram showing one exemplary form of a table to be used in the communication channel allocation processing of FIG. 5.

FIG. 7 is a diagram showing another exemplary form of a table to be used in the communication channel allocation processing of FIG. 5.

FIG. 8 is a flow chart for a communication channel combination control processing in the radio communication system of FIG. 1.

DETAILED DESCRIPTION OF THE INVENTION

Referring now to FIG. 1 to FIG. 8, one embodiment of a communication channel set up method and a communication control device according to the present invention will be described in detail.

The radio communication device according to the present invention is applicable to a radio communication system around which other radio communication systems are operated at close frequency bands.

Figure 1:
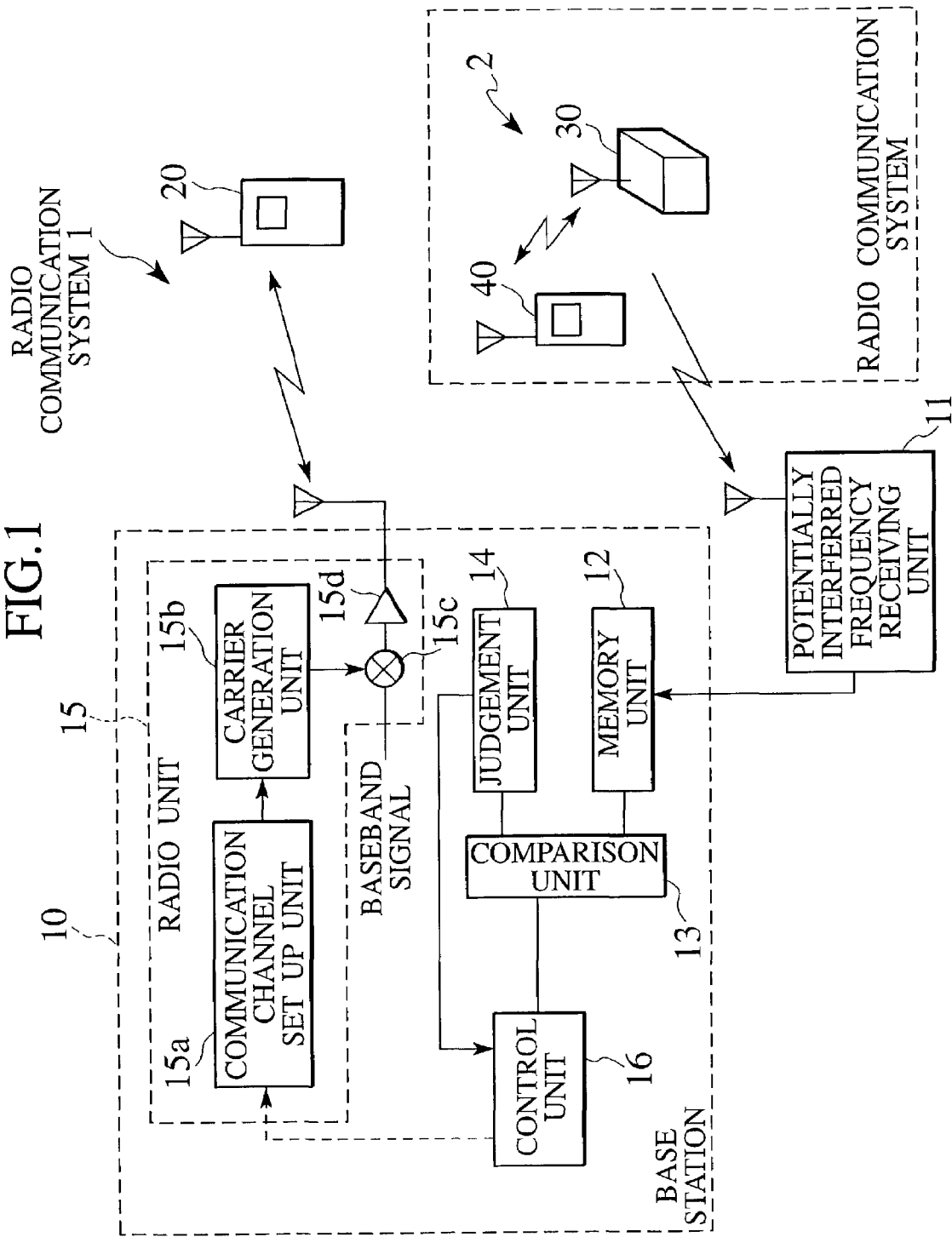
FIG. 1 is a block diagram showing an exemplary configuration of a radio communication system according to one embodiment of the present invention.

This radio communication system 1 has a base station 10 for providing a communication service and a mobile terminal device 20 for utilizing the communication service provided by this base station 10, as shown in FIG. 1, for example.

This radio communication system 1 is used under an environment in which another radio communication system 2 having a base station 30 and a mobile terminal device 40 that are using radio signals of a frequency close to that of the radio communication system 1

The base station 10 of the radio communication system 1 has a potentially interferred frequency receiving unit 11 for receiving radio signals of a frequency that can be used by the radio communication system 2, a memory unit 12 for storing a strength of radio signals received by the potentially interferred frequency receiving unit 11, a comparison unit 13 for comparing the radio signal strength stored in the memory unit 12, a judgement unit 14 for judging a state of radio signal use by the radio communication system 2 according to a comparison result obtained by the comparison unit 13, a radio unit for carrying out radio communications with the mobile terminal device 20, and a control unit 16 for executing a control of a communication channel to be used by the radio unit 15 according to a judgement result obtained by the judgement unit 14.

Also, the radio unit 15 has a radio channel set up unit 15a for carrying out a set up of a communication channel to be used between the base station 10 and the mobile terminal device 20 according to a command from the control unit 16, a carrier generation unit 15b for generating carriers of a frequency according to a command from the radio channel set up unit 15a, a modulation unit 15c for modulating the carriers generated by the carrier generation unit 15b by using a baseband signal according to the transmission data, and an RF (Radio Frequency) amplifier 15d for amplifying an output of the modulation unit 15c.

Figure 2:
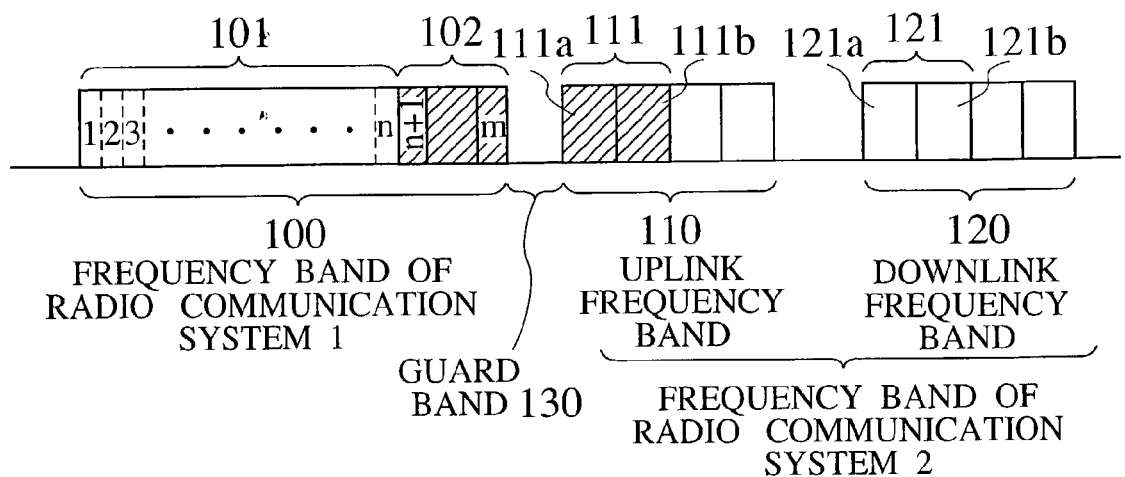
FIG. 2 is a diagram showing a relationship among frequency bands to be used by a first communication system and a second communication system in the radio communication system of FIG. 1.
Figure 3:
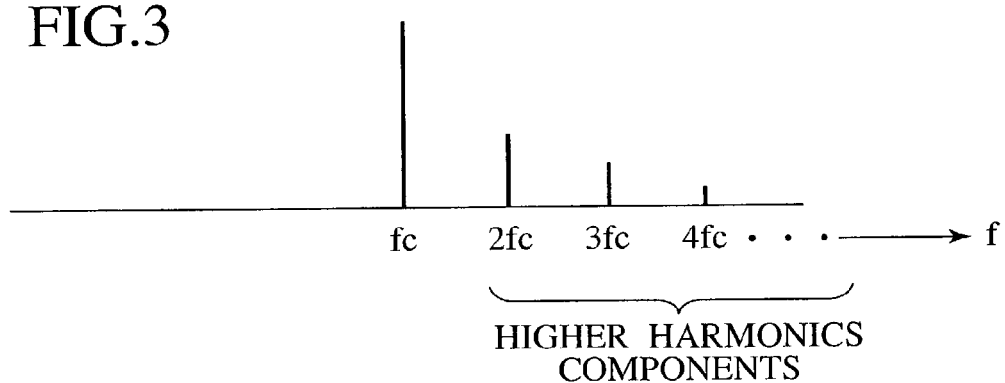
FIG. 3 is a diagram showing higher harmonic components that can be generated in the radio communication system of FIG. 1.

The radio communication system 1 is a portable telephone system known as PHS (Personal Handyphone System) that uses 1.9 GHz band radio signals, as indicated in FIG. 2, for example. This radio communication system 1 uses a multi-carrier TDMA (Time Division Multiple Access) scheme in order to carry out communications of a plurality of channels. In this scheme, 300 KHz band per one carrier, for example. For this reason, a plurality (m) of carriers are provided in a frequency band 100 that can be used by this radio communication system 1.

Also, the radio communication system 2 is a portable telephone system of IMT-2000 scheme that uses radio signals of 2 GHz band (uplink: 1.92–1.98 GHz, downlink: 2.11–2.17 GHz), as indicated in FIG. 2, for example. This radio communication system 2 uses a CDMA (Code Division Multiple Access) scheme in order to carry out communications of a plurality of channels within a 5 MHz band, for example. A plurality of 5 MHz bands can be provided for each service provider of the radio communication system 2, for example.

Between the frequency band used by the radio communication system 1 and the frequency band used by the radio communication system 2, the so called guard band 130 of about 5 MHz is provided, as indicated in FIG. 2, for example.

Now, in the radio communication device, the spurious components such as higher harmonic components of the carrier component (FIG. 3), the intermodulation distortion components (FIG. 4), etc., are generated due to the non-linearity of the amplifier, etc. For this reason, there are cases where such spurious components are generated from the base station 10 and the mobile terminal device 20 constituting the radio communication system 1. For example, at the base station 10, the spurious components are generated at the RF amplifier 15d. Some of the spurious components have the strength which becomes stronger for a frequency closer to that of the carriers which can possibly cause interferences to a part (potentially interferred frequency band) 111 of the uplink frequency band 110.

A frequency of the spurious component is in a certain relationship with a generation frequency of the carrier generation unit 15b in the case of the base station 10, for example, so that a frequency on the radio communication 2 side that can possibly be interfered when the communication channel of a specific frequency is used at the radio communication system 1 (potentially interferred frequency) can be predicted in advance. For this reason, the interferring frequency band 102 that can influence the radio communication system 2 side by the spurious components are known in advance, as indicated in FIG. 2, for example.

However, even in the case of a communication channel within such an interferring frequency band 102, if the potentially interferred frequency 111 that can possibly be interferred by the spurious components when that communication channel is used at the radio communication system 1 side is not currently used, there is no influence on the radio communication system 2 side. For this reason, there are cases where the use of the communication channel within the interferring frequency band 102 is permitted from a viewpoint of the frequency utilization efficiency, etc.

Consequently, in this radio communication system 1, whether the potentially interferred frequency band 111 is currently used at the radio communication system 2 side or not is detected, and the allocation of the communication is made according to the detection result.

The presence or absence of the use of the potentially interferred frequency band 111 at the radio communication system 2 side is judged according to the radio signals received by the potentially interferred frequency receiving unit 11 shown in FIG. 1. The frequency received by this potentially interferred frequency receiving unit 11 may be the potentially interferred frequency band 111 itself. However, there is a certain relationship between the uplink frequency and the downlink frequency used between the base station 30 and the mobile terminal device 40 at the radio communication system 2 (such as the downlink frequency=uplink frequency+0.19 GHz, for example), so that this radio communication system 1 receives the radio signals of the downlink frequency corresponding to the potentially interferred frequency band at the potentially interferred frequency receiving unit 11.

There are cases where the receiving level at the potentially interferred frequency receiving unit 11 of the radio signals of the uplink frequency transmitted from the mobile terminal device 40 becomes low as they are blocked by the building depending on the location of the mobile terminal device 40. For this reason, if the presence or absence of the use of the potentially interferred frequency band 111 is judged according to the receiving level of the uplink frequency, there can be the case of erroneous judging that the potentially interferred frequency band 111 is not used despite of the fact that it is actually used.

In contrast, the radio signals of the downlink frequency from the base station 30 can be received at a stable level as the influence due to the building or the like is small compared with the radio signals from the mobile terminal device 40. For this reason, by judging the presence or absence of the use of the potentially interferred frequency band 111 according to the radio signals of the downlink frequency, it is possible to detect the presence or absence of the use according to the actual state.

Figure 5:
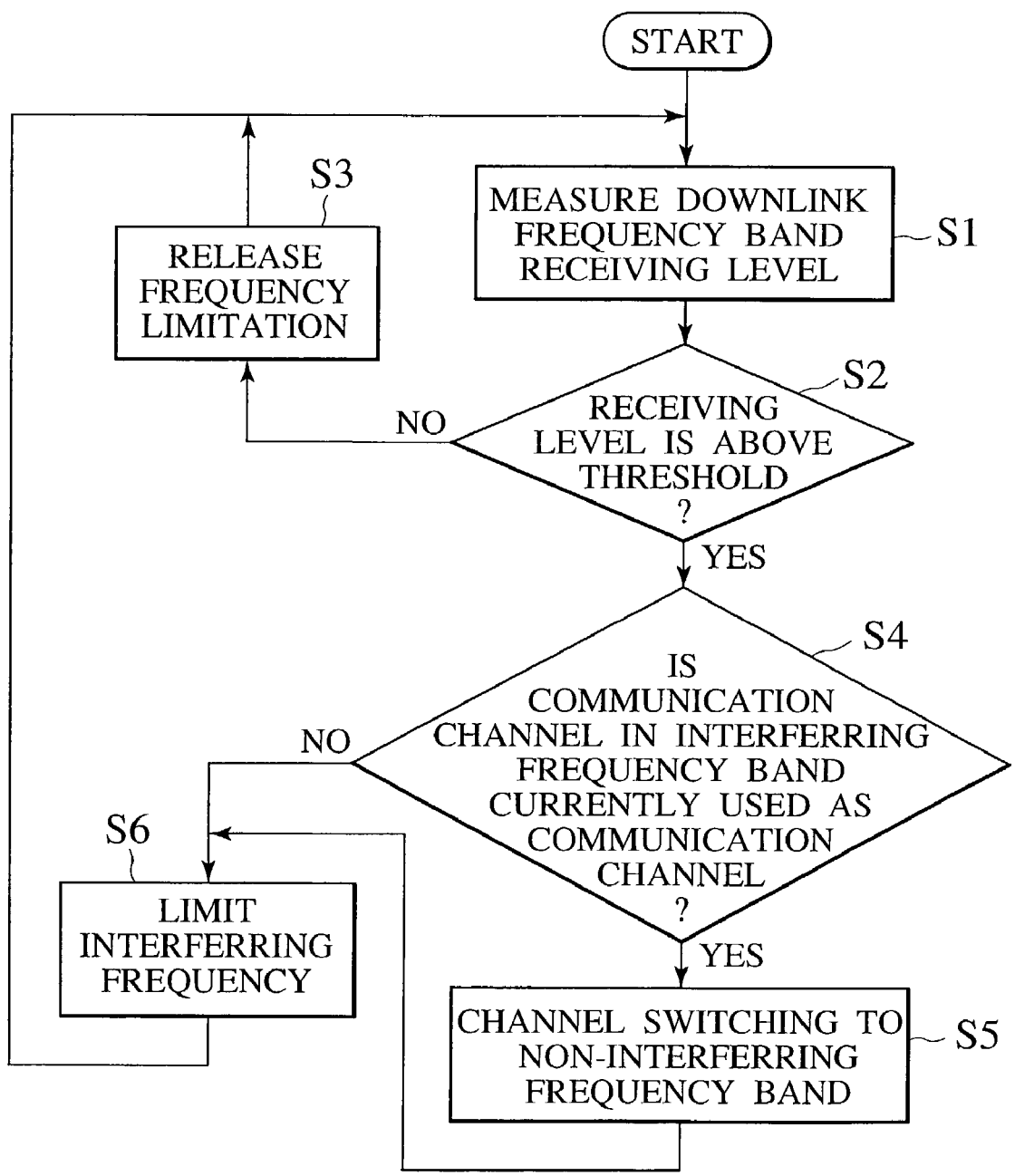
FIG. 5 is a flow chart for a communication channel allocation processing in the radio communication system of FIG. 1.

In such a communication channel allocation processing, the processing from the step S1 of FIG. 5, for example, is started at every prescribed interval.

In this step S1, the potentially interfered frequency receiving unit 11 detects the receiving levels of the prescribed frequencies 121a and 121b of the downlink frequencies corresponding to the potentially interfered frequency band 111, and supplies them into the memory unit 12.

The comparison unit 13 compares the receiving level with a prescribed threshold for each of the frequencies 121a and 121b of the downlink frequencies supplied to the memory unit 12, and supplies the comparison result to the judgement unit 14. According to the supplied comparison result for each of the frequencies 121a and 121b, the judgement unit 14 judges that the frequency is currently used when the receiving level is greater than the threshold, or that the frequency is not currently used when the receiving level is less than or equal to the threshold. The judgement unit 14 maintains the judgement result for each of the frequencies 121a and 121b in a form of a table as shown in FIG. 6, for example.

As described above, when the judgement of the use or non-use of each of the frequencies 121a and 121b is finished, the control unit 16 judges whether either one of the frequencies 121a and 121b corresponding to the potentially interfered frequency band 111 is currently used or not, at the step S2. When all the frequencies 121a and 121b are not currently used, no interference will be caused to the radio communication system 2 even when a communication channel in the interferring frequency band 102 described above is used as a communication channel by the radio communication system 1. For this reason, the control unit 16 releases the limitation of the communication channel by the radio channel set up unit 15a at the step S3, and waits for the execution of the step S1. In this way, it becomes possible to allocate a communication channel in the interferring frequency band 102, in the communication channel allocation by the radio channel set up unit 15a.

On the other hand, when either one of the frequencies 121a and 121b corresponding to the potentially interfered frequency band 111 is currently used, there is a possibility for causing the interferences to the potentially interfered frequency band 111 if a communication channel in the interferring frequency band 102 is used at the radio communication system 1 side. For this reason, the control unit 16 executes the processing of the step S4 and subsequent steps in order to limit the set up of the communication channel by the radio channel set up unit 15a.

Figures 6, 7:
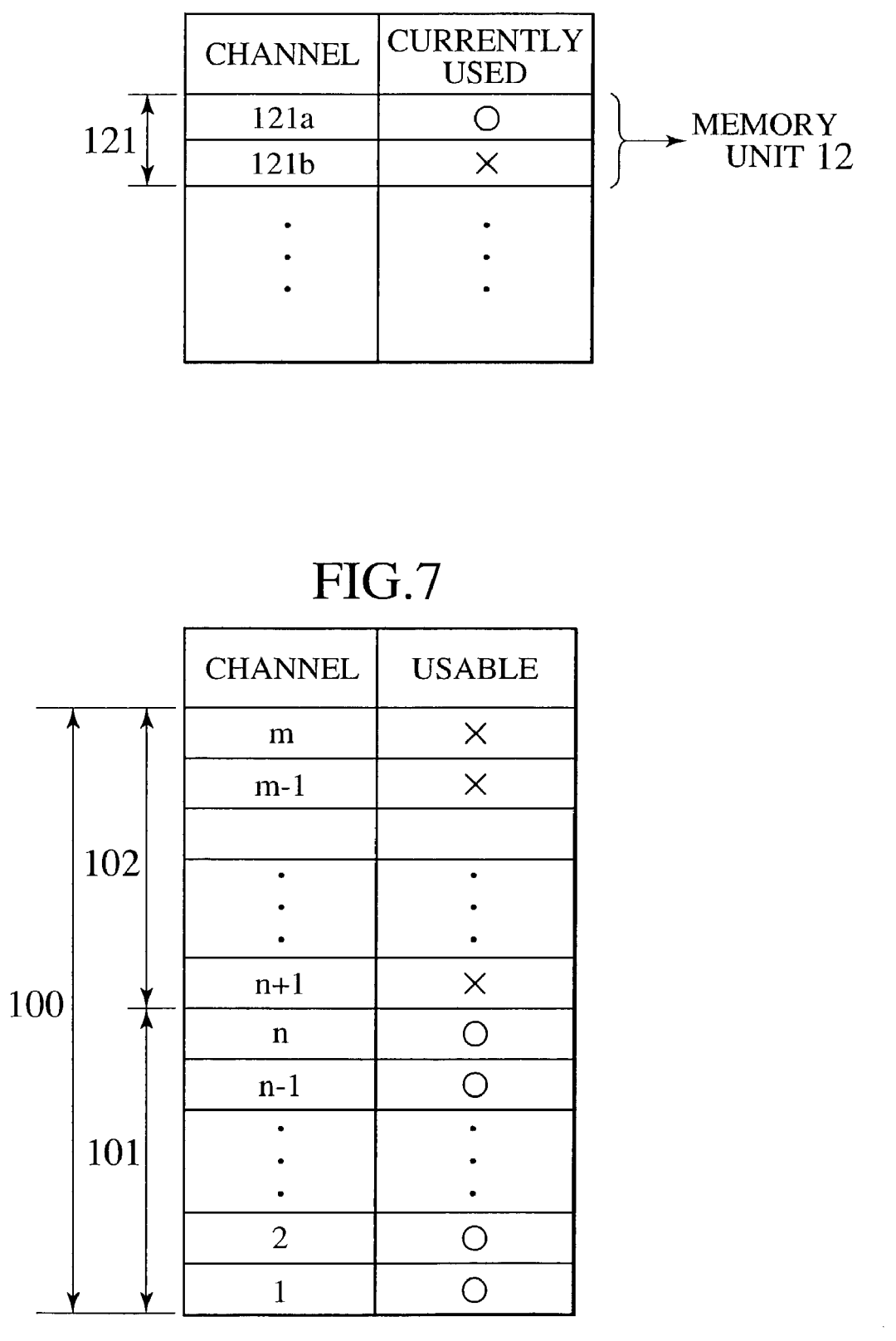

This limitation of the communication channel set up by the radio channel set up unit 15a is carried out by using a table shown in FIG. 7, for example. This table stores in correspondence all the communication channels that can possibly be used in the radio communication system 1 and information indicating whether the use of each of these communication channels is limited or not.

At the step S4, the control unit 16 detects whether the communication channel in the interferring frequency band 102 is currently used or not. When the communication channel in the interferring frequency band 102 is currently used, the control unit 16 commands the radio channel set up unit 15a to switch that currently used communication channel to the frequency band 101 other than the interferring frequency band 102 in the frequency band 100 that can be used by the radio communication system 1, at the step S5. After the communication channel is switched in response to this, the control unit 16 limits the use of the communication channel in the interferring frequency band 102 by updating the table shown in FIG. 7 described above. Thereafter, the control unit 16 waits for the execution of the step S1 described above.

On the other hand, when it is judged that the communication channel in the interferring frequency band 102 is not currently used at the step S4, the step S5 is not executed and the processing proceeds to the step S6, where the use of the communication channel in the interferring frequency band 102 is limited. In this way, only the communication channel in the frequency band 101 other than the interferring frequency band 102 will be allocated, in the communication channel allocation by the radio channel set up unit 15a.

As described above, in this radio communication system 1, whether or not the radio communication system 2 is using a frequency with respect to which interferences can possibly be caused by the spurious components when the communication channel in the interferring frequency band 102 is used, and when the radio communication system 2 is using that frequency, the communication channel outside the interferring frequency band 102 is allocated as the communication channel to be used by the radio communication system 1, such that it is possible to contribute to the reduction of the interferences caused to the radio communication system 2 due to the spurious components by the radio communication system 1.

Figure 4:
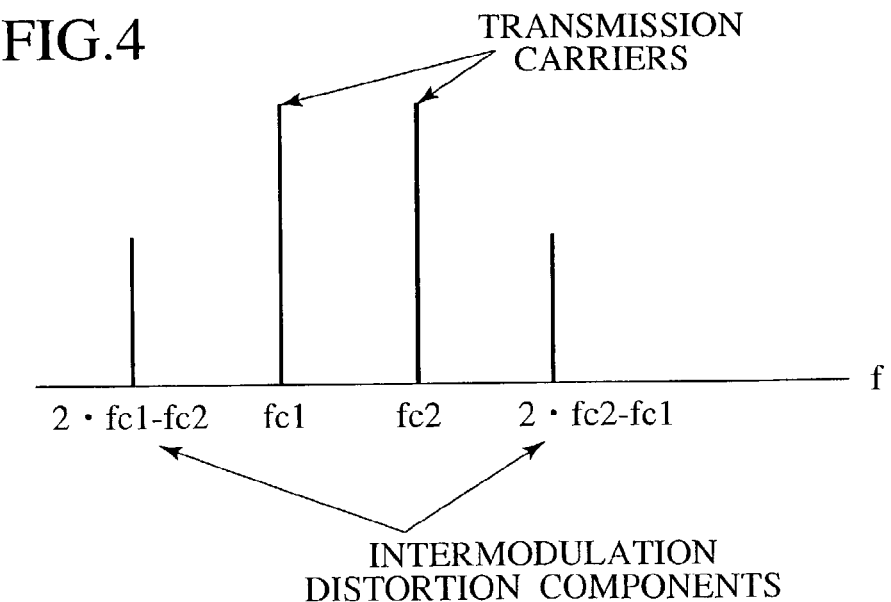
FIG. 4 is a diagram showing intermodulation distortion components that can be generated in the radio communication system of FIG. 1.

Now, when the base station 10 is configured to carry out communications by using a plurality of communication channels simultaneously, there can be cases where the intermodulation distortion components due to the non-linearity of the RF amplifier 15d or the like are generated as the spurious components. When the frequencies of the carriers to be transmitted simultaneously by the base station 10 are denoted as $fc_1$ and $fc_2$, these spurious components due to the intermodulation distortion components can be expressed in general as $a \cdot fc_1 + b \cdot fc_2$, where a and b are arbitrary non-zero integers. In particular, there are cases where the third intermodulation distortion components $2 \cdot fc_1 - fc_2$ and $2 \cdot fc_2 - fc_1$ shown in FIG. 4 are generated as relatively high level spurious components in frequency bands close to the carrier frequencies $fc_1$ and $fc_2$ to cause some problems. Also, the frequencies of these spurious components due to the intermodulation distortion components can vary according to a combination of the communication channels to be used by the base station 10.

The frequencies of such spurious components can be predicted in advance according to a combination of frequencies of the communication channels to be used by the base station 10. For this reason, in this radio communication system 1, combinations of the communication channels that can cause interferences to the potentially interfered frequency band 111 due to the spurious components are obtained in advance, and it is made possible to control the combination of the communication channels to be used by the base station 10 according to whether a frequency in the potentially interfered frequency band 111 is used by the radio communication system 2 or not.

In such a processing to control a combination of communication channels, the control unit 16 obtains the combinations of communication channels that can cause interferences to the potentially interfered frequency band 111 due to the spurious components in advance, by the procedure shown in FIG. 8, for example. These combinations are stored by the control unit 16, for example. In addition, at this point, the frequencies of the spurious components that can be generated by each combination are obtained and stored by the control unit 16.

The step S12 in FIG. 8 is executed at a prescribed interval similarly as the step S1 of FIG. 5 described above. At this step S12, the potentially interferred frequency receiving unit 11 detects the receiving levels of the prescribed frequencies 121*a* and 121*b* of the downlink frequencies corresponding to the potentially interferred frequency band 111, and supplies them into the memory unit 12.

The comparison unit 13 compares the receiving level with a prescribed threshold for each of the frequencies 121*a* and 121*b* of the downlink frequencies supplied to the memory unit 12, and supplies the comparison result to the judgement unit 14. According to the supplied comparison result for each of the frequencies 121*a* and 121*b*, the judgement unit 14 judges that the frequency is currently used when the receiving level is greater than the threshold, or that the frequency is not currently used when the receiving level is less than or equal to the threshold.

As described above, when the judgement of the use or non-use of each of the frequencies 121*a* and 121*b* is finished, the control unit 16 judges whether either one of the frequencies 121*a* and 121*b* corresponding to the potentially interferred frequency band 111 is currently used or not, at the step S13. When all the frequencies 121*a* and 121*b* are not currently used, the control unit 16 releases the limitation on a combination of the communication channels by the radio channel set up unit 15*a* at the step S14, and waits for the execution of the step S12. In this way, it becomes possible to allocate every combination of communication channels in the communication channel allocation by the radio channel set up unit 15*a*.

On the other hand, when either one of the frequencies 121*a* and 121*b* corresponding to the potentially interferred frequency band 111 is currently used, the control unit 16 judges whether one of the frequencies 121*a* and 121*b* that is currently used is a downlink frequency corresponding to a frequency (uplink frequency) corresponding to a combination of the communication channels obtained by the step S11 described above or not. If one of the frequencies 121*a* and 121*b* that is currently used is not a downlink frequency corresponding to a frequency (uplink frequency) corresponding to a combination of the communication channels obtained by the step S11, the processing proceeds to the step S14 in order not to cause the interferences to the radio communication system 2 by the spurious components from the base station 10, the limitation on the combination of the communication channels is released, and the execution of the step S12 is waited.

In contrast, if one of the frequencies 121*a* and 121*b* that is currently used is a downlink frequency corresponding to a frequency (uplink frequency) corresponding to one of the combinations of the communication channels obtained by the step S1, there is a possibility for causing the interferences to the potentially interferred frequency band 111 if that combination of the communication channels is used.

For this reason, the control unit 16 executes the processing of the step S16 and subsequent steps in order to limit that combination of the communication channels by the radio channel set up unit 15*a*. At this point, the control unit 16 first detects whether that combination of the communication channels is currently used or not.

When that combination of the communication channels is currently used, the control unit 16 commands the radio channel set up unit 15*a* to switch that currently used combination of the communication channels to another available combination, at the step S17.

After some of the communication channels are switched in response to this to make a change to another available combination, the control unit 16 limits an available combination of the communication channels at the step S18. Thereafter, the control unit 16 waits for the execution of the step S12 described above.

On the other hand, when it is judged that that combination of the communication channels is not currently used at the step S16, the step S17 is not executed and the processing proceeds to the step S18, where the combination of the communication channels is limited. In this way, only the combination of the communication channels that does not cause the interferences to the potentially interferred frequency band 111 will be allocated as a combination of the communication channels by the radio channel set up unit 15*a*.

As described above, in this radio communication system 1, the combinations of the communication channels that can cause the interferences to the potentially interferred frequency band 111 by the spurious components are obtained in advance, and a combination of communication channels to be used by the base station 10 is controlled according to whether or not a frequency in the potentially interferred frequency band 111 is used by the radio communication system 2. In this way, it is possible to contribute to the reduction of the interferences caused to the radio communication system 2 due to the spurious components by the radio communication system 1.

Note that, in the above description, the present invention has been described from a viewpoint of reducing the interferences caused to the radio communication system 2 by the radio communication 1, but it is also possible to apply the present invention to reduce the interferences caused to the radio communication system 1 by the radio communication system 2.

The application target of the present invention is not limited to the above described embodiment, and the present invention is applicable to any case of preventing the interferences between the radio communication systems that use close frequencies. For example, the above embodiment is directed to the case where the radio communication system 2 uses the FDD (Frequency Division Duplex) scheme in which the uplink frequency and the downlink frequency are different, but it is also possible to apply the present invention to the case of using the TDD (Time Division Duplex) scheme in which the uplink and the downlink are multiplexed on a time axis. In this case, the communication channels are further divided in time by the time-slots in the potentially interferred frequency band, so that it is possible to avoid the interferences by controlling the allocation of the communication channels by predicting the presence or absence of the interferences in units of the time-slots.

In addition, the present invention is also applicable not only for the avoidance of interferences between different radio communication systems but also to the avoidance of interferences between the same radio communication systems such as between the PHSs or the IMT-2000 systems, for example.

As described, according to the communication channel set up method of the present invention, the utilization state of a prescribed frequency in the first frequency band that causes interferences to the first communication system when the communication channel of a particular frequency in the second frequency band is used at the second communication system is detected, and if the prescribed frequency in the first frequency band is currently used, the communication channel other than that of the particular frequency is allocated to the second communication system.

In this way, it is possible to contribute to the reduction of the interferences caused to the first communication system by the second communication system. In addition, it is possible to allocate the communication channel of the particular frequency in the second frequency band when the prescribed frequency in the first frequency band is not currently used, so that it is possible to contribute to the improvement of the frequency utilization efficiency.

Also, according to the communication control device of the present invention, the detection unit detects the utilization state of a prescribed frequency in the first frequency band that causes interferences to the first communication system when the communication channel of a particular frequency in the second frequency band is used at the second communication system, and if the prescribed frequency in the first frequency band is currently used, the communication channel other than that of the particular frequency is allocated to the second communication system.

In this way, it is possible to contribute to the reduction of the interferences caused to the first communication system by the second communication system. In addition, it is possible to allocate the communication channel of the particular frequency in the second frequency band when the prescribed frequency in the first frequency band is not currently used, so that it is possible to contribute to the improvement of the frequency utilization efficiency.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A communication channel set up method for setting up a communication channel to be used by a second radio communication system that can use a second frequency band close to but different from a first frequency band that can be used by a first radio communication system, comprising:
   detecting a utilization state of a prescribed frequency in the first frequency band that can cause interferences to the first radio communication system when a communication channel of a particular frequency in the second frequency band is used by the second radio communication system; and
   allocating a communication channel other than that of the particular frequency to the second radio communication system when the prescribed frequency in the first frequency band is currently used by the first radio communication system,
   wherein the detecting step detects the utilization state of the prescribed frequency in the first frequency band that can cause interferences due to spurious components generated outside the second frequency band by the second radio communication system, by predicting frequencies of the spurious components in advance according to a combination of frequencies of the communication channels to be used by the second radio communication system, and
   wherein said spurious components are different than communication channels.

2. The communication channel set up method of claim 1, wherein the first radio communication system uses an uplink frequency in the first frequency band and a downlink frequency corresponding to the uplink frequency, and
   the detecting step detects the utilization state of the prescribed frequency in the first frequency band according to a utilization state of the downlink frequency corresponding to the uplink frequency or the uplink frequency corresponding to the downlink frequency when the prescribed frequency in the first frequency band is the uplink frequency or the downlink frequency, respectively.

3. The communication channel set up method of claim 1, wherein the detecting step further comprises:
   detecting a signal strength of the prescribed frequency in the first frequency band; and
   judging whether signals of the prescribed frequency are currently used when a detected signal strength is greater than a prescribed threshold.

4. The communication channel set up method of claim 1, wherein the detecting step further comprises:
   obtaining the prescribed frequency in the first frequency band by receiving signals from the first radio communication system at the second radio communication system.

5. A communication control device for controlling a communication channel to be used by a second radio communication system that can use a second frequency band close to but different from a first frequency band that can be used by a first radio communication system, comprising:
   a detection unit configured to detect a utilization state of a prescribed frequency in the first frequency band that can cause interferences to the first radio communication system when a communication channel of a particular frequency in the second frequency band is used by the second radio communication system; and
   an allocation unit configured to allocate a communication channel other than that of the particular frequency to the second radio communication system when the prescribed frequency in the first frequency band is currently used by the first radio communication system,
   wherein the detecting step detects the utilization state of the prescribed frequency in the first frequency band that can cause interferences due to spurious components generated outside the second frequency band by the second radio communication system, by predicting frequencies of the spurious components in advance according to a combination of frequencies of the communication channels to be used by the second radio communication system, and
   wherein said spurious components are different than communication channels.

6. The communication control device of claim 5, wherein the first radio communication system uses an uplink frequency in the first frequency band and a downlink frequency corresponding to the uplink frequency, and
   the detection unit detects the utilization state of the prescribed frequency in the first frequency band according to a utilization state of the downlink frequency corresponding to the uplink frequency or the uplink frequency corresponding to the downlink frequency when the prescribed frequency in the first frequency band is the uplink frequency or the downlink frequency, respectively.

7. The communication control device of claim 5, wherein the detection unit is configured to detect a signal strength of the prescribed frequency in the first frequency band, and to judge whether signals of the prescribed frequency are currently used when a detected signal strength is greater than a prescribed threshold.

8. The communication control device of claim 5, wherein the detection unit is configured to obtain the prescribed frequency in the first frequency band by receiving signals from the first radio communication system at the second radio communication system.

* * * * *